(12) United States Patent
Sagawa

(10) Patent No.: US 7,931,378 B2
(45) Date of Patent: Apr. 26, 2011

(54) CONTROL SYSTEM, PROJECTOR, PROGRAM, AND INFORMATION STORAGE MEDIUM

(75) Inventor: Takahiro Sagawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 346 days.

(21) Appl. No.: 12/176,786

(22) Filed: Jul. 21, 2008

(65) Prior Publication Data

US 2009/0040475 A1 Feb. 12, 2009

(30) Foreign Application Priority Data

Aug. 7, 2007 (JP) ................................. 2007-205236

(51) Int. Cl.
*G02B 21/20* (2006.01)
(52) U.S. Cl. ................................. 353/94; 353/85; 355/71
(58) Field of Classification Search .................... 353/94, 353/85; 355/71
See application file for complete search history.

(56) References Cited

U.S. PATENT DOCUMENTS

| | | | |
|---|---|---|---|
| 5,896,189 A * | 4/1999 | Watkins ........................... | 355/71 |
| 6,543,900 B2 | 4/2003 | Noji et al. | |
| 6,561,654 B2 | 5/2003 | Mukawa et al. | |
| 6,710,762 B1 | 3/2004 | Hasegawa | |
| 7,027,016 B2 | 4/2006 | Sakashita | |
| 7,348,530 B2 | 3/2008 | Cheang et al. | |
| 7,466,499 B2 | 12/2008 | Takeuchi et al. | |
| 7,474,289 B2 | 1/2009 | Sakashita | |
| 7,532,176 B2 | 5/2009 | Imade | |

FOREIGN PATENT DOCUMENTS

| | | |
|---|---|---|
| EP | 0766481 A | 4/1997 |
| JP | 04-033034 U | 3/1992 |
| JP | 09-096786 A | 4/1997 |
| JP | 09-127467 A | 5/1997 |
| JP | 2000-147661 A | 5/2000 |
| JP | 2002-031846 A | 1/2002 |
| JP | 2002-055394 A | 2/2002 |
| JP | 2002-296680 A | 10/2002 |
| JP | 2004-138637 A | 5/2004 |
| JP | 2004-286858 A | 10/2004 |
| JP | 2005-077890 A | 3/2005 |
| JP | 2005-106852 A | 4/2005 |
| JP | 2005-241708 A | 9/2005 |
| JP | 2006-017801 A | 1/2006 |
| JP | 2006-120627 A | 5/2006 |
| JP | 2006-215136 A | 8/2006 |
| JP | 2006-337941 A | 12/2006 |
| JP | 2007-087816 A | 4/2007 |
| JP | 2007-114406 A | 5/2007 |
| JP | 2007-147870 | 6/2007 |
| JP | 2007-165336 A | 6/2007 |
| JP | 2007-171660 A | 7/2007 |
| JP | 2009-016040 A | 1/2009 |
| WO | WO-2007-049659 A | 5/2007 |

* cited by examiner

*Primary Examiner* — Seung C Sohn
(74) *Attorney, Agent, or Firm* — AdvantEdge Law Group, LLC

(57) ABSTRACT

A control system includes a principal light source for outputting light to a light path used for image projection, an auxiliary light source for outputting light to the light path, and a control section for controlling light intensity of the auxiliary light source, and the control section performs one of control of setting combined light intensity obtained by combining light intensity of the principal light source and the light intensity of the auxiliary light source with each other in a certain range, or control of setting the combined light intensity to be equal to or higher than a predetermined value.

9 Claims, 9 Drawing Sheets

US 7,931,378 B2

CONTROL SYSTEM, PROJECTOR, PROGRAM, AND INFORMATION STORAGE MEDIUM

BACKGROUND

1. Technical Field

The present invention relates to a control system, a projector, a program, and an information storage medium each for controlling light intensity.

2. Related Art

As a light source of a commonly used projector, there is used a super-high pressure mercury lamp. Although the super-high pressure mercury lamp has sufficient emission efficiency, it takes time before the super-high pressure mercury lamp provides the desired light intensity. Therefore, it takes about one minute before the projector in the related art actually displays an image.

As a measure for solving such a problem, there can be cited a method of using an auxiliary light source in addition to the super-high pressure mercury lamp. For example, in JP-A-2007-147870, there is proposed a method of providing a projector with a white light source and an auxiliary light source, and controlling increase in the light intensity of the auxiliary light source.

However, the measure of only controlling increase in the light intensity of the auxiliary light source fails to provide the effect of reducing the length of time before the image is displayed, and moreover, varies the light intensity to make the image far from eye-friendly.

SUMMARY

The present invention has an advantage of providing a control system, a projector, a program, and an information storage medium each capable of reducing the length of time before an image is actually displayed while suppressing the variation in light intensity even in the case of using a principal light source, which needs time before providing the desired light intensity.

A control system according to an aspect of the invention includes a principal light source for outputting light to a light path used for image projection, an auxiliary light source for outputting light to the light path, and a control section for controlling light intensity of the auxiliary light source, and the control section performs control of setting combined light intensity obtained by combining light intensity of the principal light source and the light intensity of the auxiliary light source with each other in a certain range, or control of setting the combined light intensity to be equal to or higher than a predetermined value.

Further, a projector according to another aspect of the invention includes the control system described above, and a projection section for projecting an image using the light from the light path.

Further, according to still another aspect of the invention, there is provided a program executable by a computer included in a projector having a projection section for projecting an image, a principal light source for outputting light to a light path used for image projection and an auxiliary light source for outputting light to the light path for allowing the computer to function as a control section executing a process including the step of performing one of control of setting combined light intensity obtained by combining light intensity of a principal light source and light intensity of an auxiliary light source with each other in a certain range and control of setting the combined light intensity to be equal to or higher than a predetermined value.

Further, according to another aspect of the invention, there is provided a computer readable information storage medium storing a program executable by a computer included in a projector having a projection section for projecting an image, a principal light source for outputting light to a light path used for image projection and an auxiliary light source for outputting light to the light path for allowing the computer to function as a control section executing a process comprising the step of performing one of control of setting combined light intensity obtained by combining light intensity of a principal light source and light intensity of an auxiliary light source with each other in a certain range and control of setting the combined light intensity to be equal to or higher than a predetermined value.

According to these aspects of the invention, the control system and so on can shorten the length of time before the image is actually displayed while suppressing the variation in light intensity by executing the control for keeping the combined light intensity in a certain range or the control for setting the combined light intensity to be equal to or higher than a predetermined value on the auxiliary light source even in the case in which the principal light source requiring time before providing the desired light intensity is used.

Further, it is also possible that the control system includes a measurement section for measuring the combined light intensity, and the control section performs the control of the auxiliary light source based on the combined light intensity measured by the measurement section.

According to this configuration, the control system and so on can perform the control more accurately by measuring the combined light intensity.

Further, it is also possible that the control system includes a measurement section for measuring the light intensity of the principal light source, and the control section performs the control of the auxiliary light source based on the light intensity of the principal light source measured by the measurement section.

According to this configuration, the control system and so on can perform the control in accordance with the light intensity of the principal light source by measuring the light intensity of the principal light source.

Further, the auxiliary light source can be a light source requiring a smaller amount of time before providing desired light intensity compared to the principal light source.

According to this configuration, the control system and so on can reduce the amount of time before an image is actually displayed while suppressing the variation in the light intensity even in the case in which the principal light source requiring substantial time before providing desired light intensity is used.

Further, it is also possible that the auxiliary light source is composed of a plurality of light sources, and the control section controls the light intensity of the auxiliary light source by controlling the lighting states of the plurality of light sources.

According to this configuration, the control system and so on can suppress the variation in the combined light intensity by controlling the lighting states of the plurality of light sources forming the auxiliary light source.

Further, it is also possible that the auxiliary light source is composed of at least one light source, and the control section controls the light intensity of the auxiliary light source by controlling the lighting state of the at least one of light source.

According to this configuration, the control system and so on can suppress the variation in the combined light intensity by controlling the lighting state of the auxiliary light source.

Further, the control section can adjust the control of the auxiliary light source based on at least one of time elapsed after start-up of the projector, accumulated running time of the projector, ambient temperature of the projector, and internal temperature of the projector.

According to this configuration, the control system and so on can appropriately control the light intensity even in the case in which the condition of the projector is caused to be different from the normal condition by either one of the elapsed time, the accumulated running time, the ambient temperature, and the internal temperature.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Hereinafter, embodiments of the invention applied to projectors will be described with reference to the accompanying drawings. It should be noted that the embodiments described below do not at all limit contents of the invention as described in the appended claims. Further, not necessarily all of the constituents shown in the embodiments below are indispensable as the solution of the invention described in the appended claims.

First Embodiment

Figure 1:
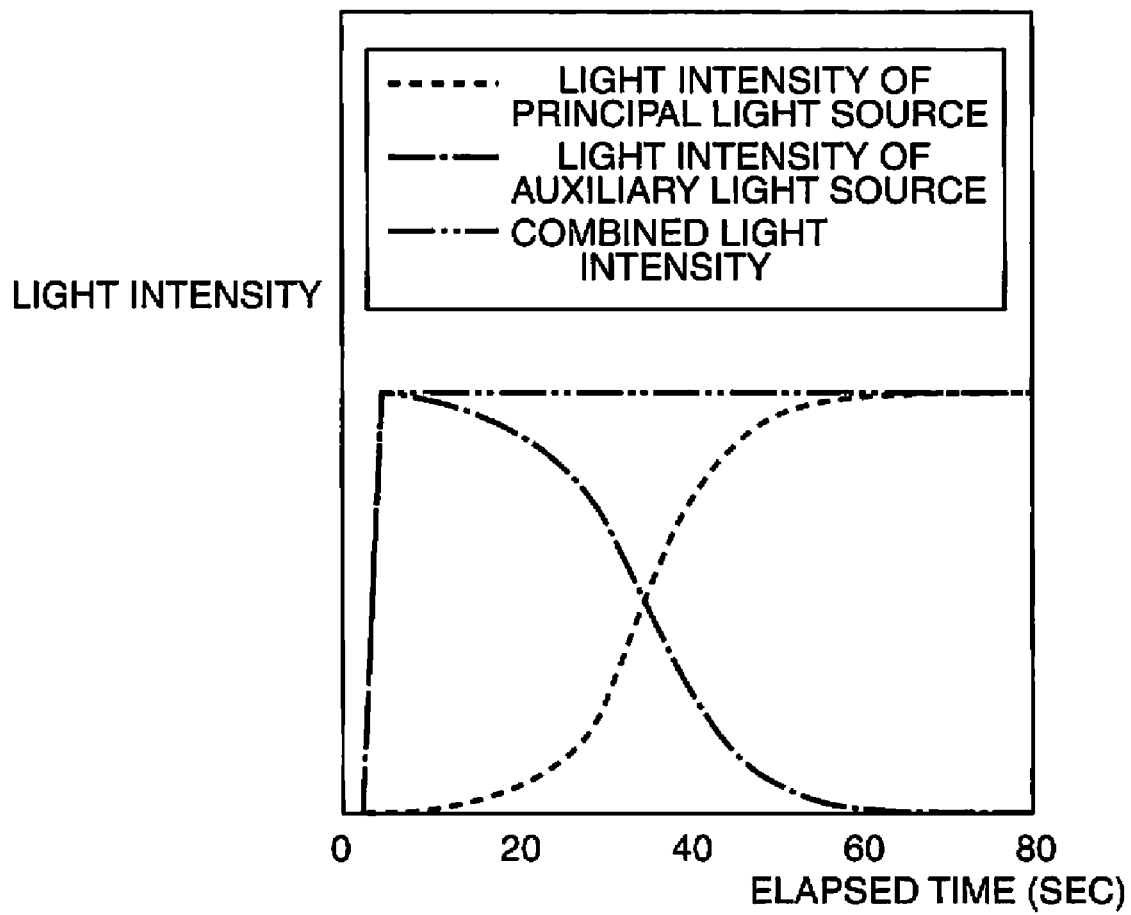
FIG. 1 is a diagram showing combined light intensity according to a first embodiment of the invention.

FIG. 1 is a diagram showing combined light intensity according to a first embodiment of the invention. In the present embodiment, the projector is configured including a principal light source and an auxiliary light source. The principal light source is a super-high pressure mercury lamp, which is a light source requiring longer time before providing the desired light intensity compared to the auxiliary light source. In contrast, the auxiliary light source is a light source for emitting light in a small amount of time such as a cold-cathode tube. The projector of the present embodiment is capable of keeping the combined light intensity, which is obtained by combining the light intensity of the principal light source and the light intensity of the auxiliary light source, substantially constant by driving the auxiliary light source simultaneously with starting driving the principal light source, and controlling the driving amount of the auxiliary light source in accordance with the light intensity of the principal light source.

Figure 2:
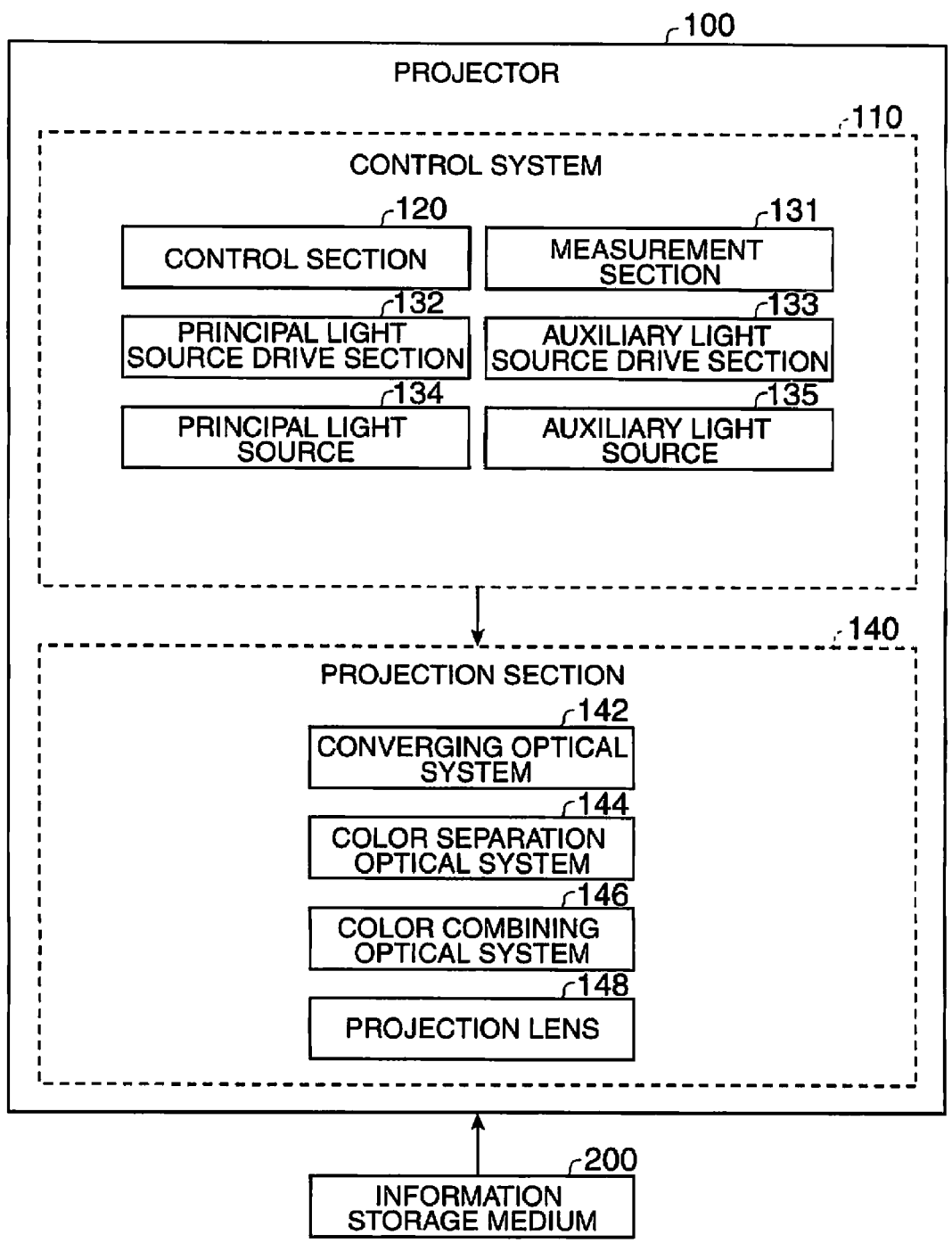
FIG. 2 is a functional block diagram of a projector according to the first embodiment of the invention.

Hereinafter, the functional block of the projector having such a function will be described. FIG. 2 is a functional block diagram of a projector 100 according to the first embodiment of the invention. The projector 100 is configured including a control system 110 for performing various kinds of control and a projection section 140.

The control system 110 is configured including a principal light source 134, a principal light source drive section 132 for driving the principal light source 134, an auxiliary light source 135, an auxiliary light source drive section 133 for driving the auxiliary light source 135, a measurement section 131 for measuring light intensity, and a control section 120 for performing, for example, control of the principal light source drive section 132 and the auxiliary light source drive section 133.

The projection section 140 is a light path of the light emitted from the principal light source 134 and the auxiliary light source 135, and is configured including a converging optical system 142 for controlling the direction of the light, a color separation optical system 144 for separating the light from the converging optical system 142 into the respective light beams of RGB, a color combining optical system 146 for combining the light beams separated by the color separation optical system 144 into one light beam, and a projection lens 148 for outputting the light beam from the color combining optical system 146 to the outside thereof thereby projecting an image.

Figure 3:
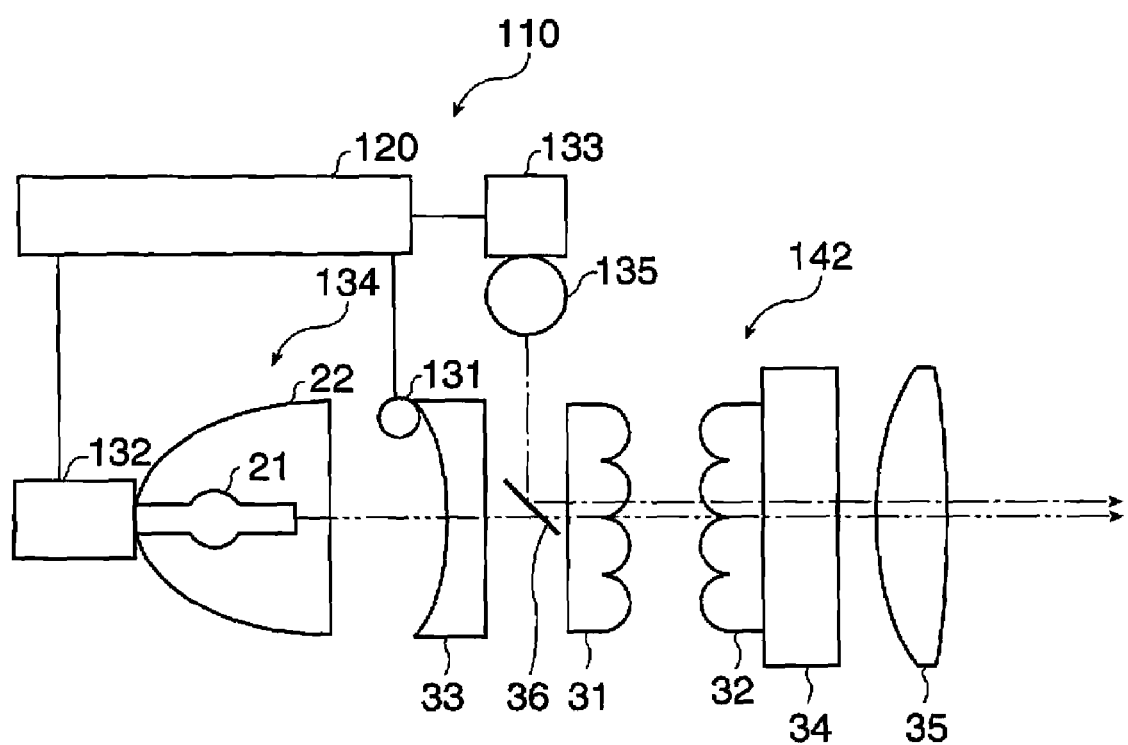
FIG. 3 is a diagram showing a configuration of a control system and a converging optical system according to the first embodiment of the invention.

Then, the configuration of the control system 110 and the converging optical system 142 will hereinafter be explained in further detail. FIG. 3 is a diagram showing the configuration of the control system 110 and the converging optical system 142 according to the first embodiment of the invention. The principal light source 134 is configured including a light source lamp 21 for outputting the light and a concave mirror 22 for reflecting the light emitted from the light source lamp 21.

The converging optical system 142 is configured including a collimating lens 33, a half mirror 36, a first lens array 31, a second lens array 32, a polarization conversion section 34, and an overlapping lens 35. The collimating lens 33 collimates the light output from the light source lamp 21 and the concave mirror 22 to form parallel light. The half mirror 36 is disposed between the collimating lens 33 and the first lens array 31, and reflects the light from the auxiliary light source 135 while transmitting the light from the collimating lens 33. It should be noted that although the measurement section 131 is disposed between the principal light source 134 and the collimating lens 33, the measurement section 131 needs only to be located on the light path of the principal light source 134 at an anterior position from the position where the light from the auxiliary light source 135 is combined therewith, and is not limited to be located at the position shown in FIG. 3.

The first lens array 31 is an optical element for dividing the light beam from the collimating lens 33 and the half mirror 36 into a plurality of partial light beams. Further, the second lens array 32 is an optical element for collecting the plurality of partial light beams divided by the first lens array 31. The first lens array 31 and the second lens array 32 each have a plurality of small lenses arranged in a matrix on a plane perpendicular to an optical axis thereof.

The polarization conversion section 34 is composed of a polarization beam splitter (PBS), and aligns the polarization directions of the respective partial light beams from the second lens array 32 to form linearly polarized light beams of the same directions. Further, the overlapping lens 35 is an optical element for collecting the plurality of partial light beams from the polarization conversion section 34, and making the collected light beams enter image forming areas of the respective liquid crystal panels of RGB in the color separation optical system 144.

It should be noted that as the hardware such as the control section 120, the following can be adopted. For example, there can be adopted a CPU as the control section 120, a ballast as the principal light source drive section 132 and the auxiliary light source drive section 133, and a luminance sensor or an illuminance sensor as the measurement section 131.

Further, a computer provided to the projector 100 can implement the function of the control section 120 and so on by loading a program from an information storage medium 200. As such an information storage medium 200, for example, CD-ROM, DVD-ROM, ROM, RAM, and HDD can be used, and either of the loading types of the program, contact type and noncontact type, can be adopted.

Figure 4:
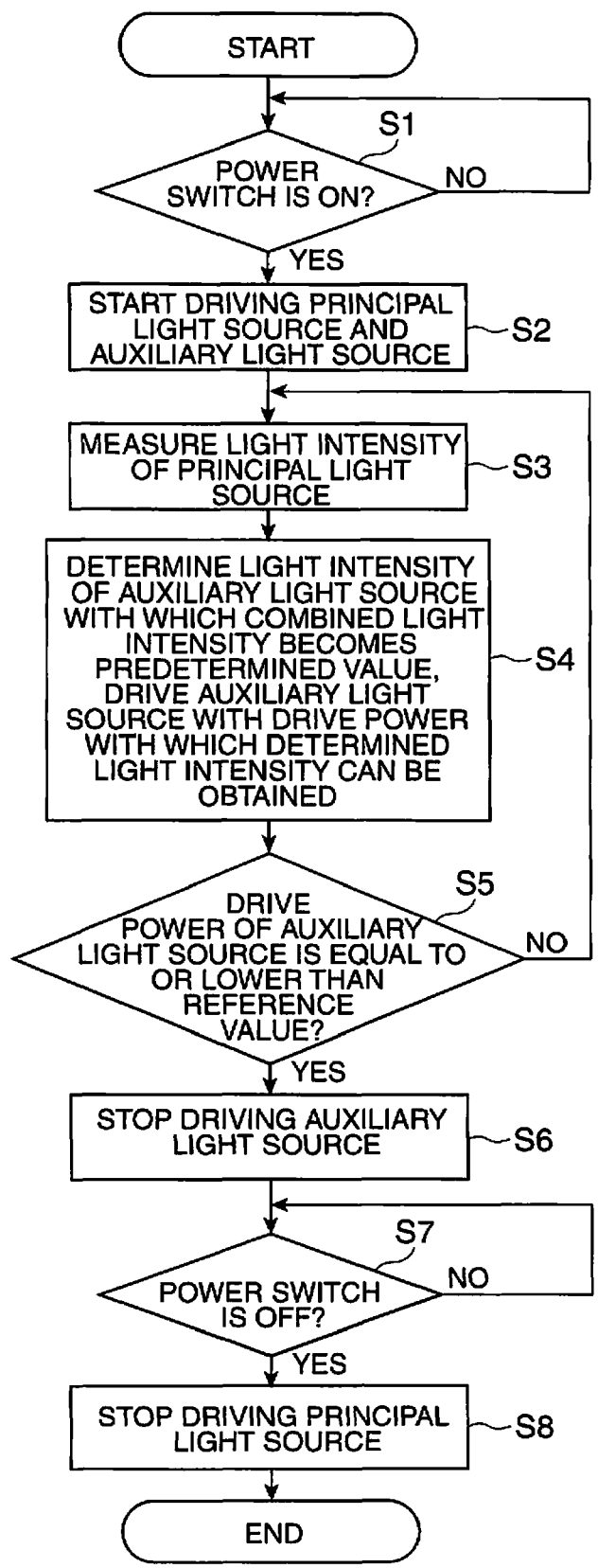
FIG. 4 is a flowchart showing a light intensity control procedure according to the first embodiment of the invention.

Then, the light intensity control procedure using the control section 120 will hereinafter be explained. FIG. 4 is a flowchart showing the light intensity control procedure according to the first embodiment of the invention. The control section 120 judges whether or not a power switch of the projector 100 is turned ON (step S1).

If the power switch is turned ON, the control section 120 controls the principal light source drive section 132 and the auxiliary light source drive section 133 to start driving the principal light source 134 and the auxiliary light source 135 (step S2). On this occasion, the control section 120 can control driving the auxiliary light source 135, for example, with the maximum drive amount or a drive amount greater than a predetermined value.

The control section 120 controls the measurement section 131 to measure the light intensity of the principal light source 134 (step S3). Then, the control section 120 determines the light intensity of the auxiliary light source 135 based on the light intensity of the principal light source 134 measured by the measurement section 131 so that the combined light intensity is kept at a predetermined value (the desired combined light intensity shown in FIG. 1), and controls the auxiliary light source drive section 133 to drive the auxiliary light source 135 with the drive power for achieving that light intensity, and the auxiliary light source drive section 133 drives the auxiliary light source 135 in accordance with the control signal from the control section 120 (step S4). On this occasion, the control section 120 can control driving the auxiliary light source 135 so as to reduce the drive power of the auxiliary light source 135, for example.

It should be noted that as a method of controlling driving of the auxiliary light source 135, for example, a method of controlling the pulse width of the auxiliary light source 135 can also be adopted besides the method of controlling the drive power. Further, the control section 120 can also determine the drive power based on a table representing the relationship between the light intensity of the principal light source 134 and drive power of the auxiliary light source 135 corresponding to the light intensity.

The control section 120 judges whether or not the drive power of the auxiliary light source 135 is equal to or lower than a reference value (step S5). It should be noted that instead of this judgment, the control section 120 can also perform, for example, a judgment of whether or not the light intensity of the principal light source 134 is equal to or higher than a second reference value. These reference values vary depending on the hardware and so on used therefor, and are determined to appropriate values by experiments conducted by a developer or the like.

If the drive power of the auxiliary light source 135 is equal to or lower than the reference value, the control section 120 controls the auxiliary light source drive section 133 to stop driving the auxiliary light source 135 (step S6). On the other hand, if the drive power of the auxiliary light source 135 exceeds the reference value, the projector 100 executes the process of steps S3 through S5 repeatedly.

The control section 120 judges whether or not the power switch of the projector 100 is turned OFF (step S7). If the power switch is turned OFF, the control section 120 controls the principal light source drive section 132 to stop driving the principal light source 134 (and controls also the auxiliary light source drive section 133 to stop driving the auxiliary light source 135 if the auxiliary light source 135 is also driven) (step S8).

As described above, according to the present embodiment, the projector 100 can shorten the length of time before the image is actually displayed while suppressing the variation in light intensity by executing the control for keeping the combined light intensity at a certain value (in a certain range) on the auxiliary light source 135 even in the case in which the principal light source 134 requiring time before providing the desired light intensity is used. Moreover, since the projector 100 stops driving the auxiliary light source 135 when the drive power of the auxiliary light source 135 becomes equal to or lower than the reference value in the condition in which the combined light intensity is at a predetermined value, the drive power of the auxiliary light source 135 can be eliminated after the light intensity of the principal light source 134 is stabilized, thus the image can be projected with low power consumption.

Further, according to the present embodiment, the projector 100 can perform the control in accordance with the light intensity of the principal light source 134 by measuring the light intensity of the principal light source 134. For example, since the projector 100 can perform the control such that driving of the auxiliary light source 135 is stopped when the light intensity of the principal light source 134 exceeds a predetermined value, the projector 100 can not only project an image in a small amount of time, but also achieve low power consumption in the condition in which the light intensity of the principal light source 134 is stabled.

Second Embodiment

Although only one auxiliary light source 135 is used in the first embodiment, it is also possible that a plurality of auxiliary light sources 135 is used therein. Further, although the light intensity of the principal light source 134 is measured in the first embodiment, the combined light intensity can also be measured. Further, although the auxiliary light source 135 is controlled in the first embodiment so that the combined light intensity falls within a predetermined range, it is also possible that the auxiliary light sources 135 are controlled so that the combined light intensity exceeds a predetermined value. Then, the embodiment in which the plurality of auxiliary light sources 135 is used, the combined light intensity is measured, and the auxiliary light sources 135 are controlled so that the combined light intensity exceeds a predetermined value will hereinafter be explained.

Figure 5:
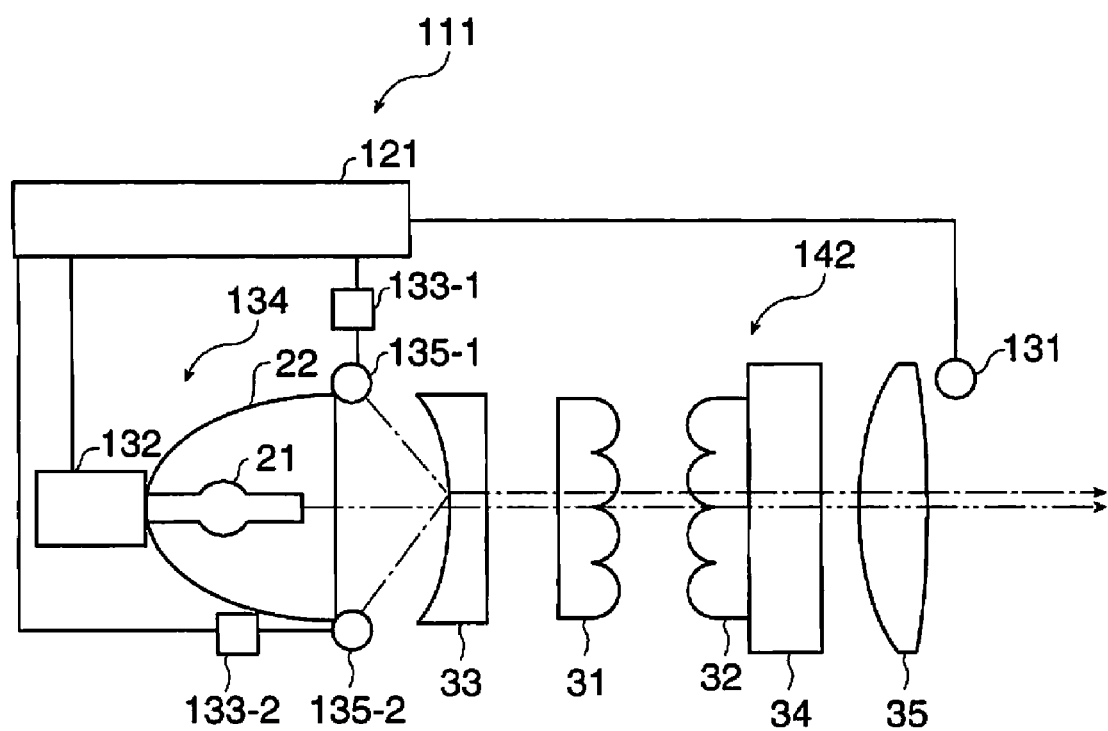
FIG. 5 is a diagram showing a configuration of a control system and a converging optical system according to a second embodiment of the invention.

FIG. 5 is a diagram showing a configuration of the control system 111 and the converging optical system 142 according to the second embodiment of the invention. The control system 111 is configured including a plurality of auxiliary light sources 135-1, 135-2, auxiliary light source drive sections 133-1, 133-2, a measurement section 131 for measuring the combined light intensity, auxiliary light source drive sections 133-1, 133-2, and a control section 121 for controlling the measurement section 131 and so on.

It should be noted that the auxiliary light sources 135-1, 135-2 are disposed between the principal light source 134 and the collimating lens 33, and output the light to the collimating lens 33 from the principal light source 134 side. Further, the measurement section 131 is disposed between the overlapping lens 35 and the color separation optical system 144, and measures the light intensity of the combined light output from the overlapping lens 35.

Figure 6:
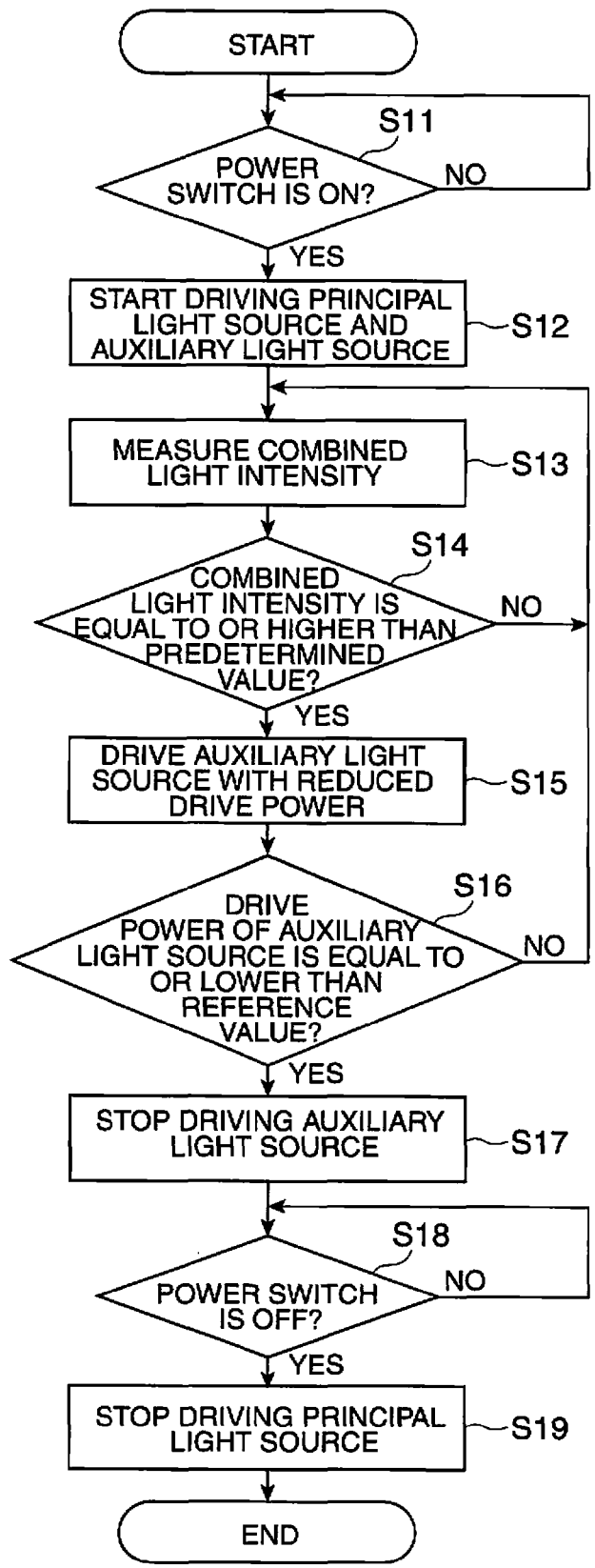
FIG. 6 is a flowchart showing a light intensity control procedure according to the second embodiment of the invention.

Then, the light intensity control procedure using these elements will hereinafter be explained. FIG. 6 is a flowchart showing the light intensity control procedure according to the second embodiment of the invention. The control section 121 judges whether or not the power switch of the projector 100 is turned ON (step S11).

If the power switch is turned ON, the control section 121 controls the principal light source drive section 132 and the auxiliary light source drive sections 133-1, 133-2 to start driving the principal light source 134 and the auxiliary light sources 135-1, 135-2 (step S12).

The control section 121 controls the measurement section 131 to measure the combined light intensity (step S13). Subsequently, the control section 121 judges whether or not the combined light intensity measured by the measuring section 131 is equal to or greater than a predetermined value (e.g., the predetermined value in the first embodiment) (step S14).

If the combined light intensity is equal to or greater than the predetermined value, the control section 121 controls the auxiliary light source drive sections 133-1, 133-2 to drive the auxiliary light sources 135-1, 135-2 with reduced drive power, and the auxiliary light source drive sections 133-1, 133-2 drive the auxiliary light sources 135-1, 135-2, respectively, in accordance with the control signals from the control section 121 (step S15).

On the other hand, if the combined light intensity is lower than the predetermined value, the projector 100 repeatedly executes the process of the steps S13, S14 without changing the drive power of the auxiliary light sources 135-1, 135-2. It should be noted that since the light intensity of the principal light source 134 increases gradually as time elapses, the combined light intensity increases even in the case in which the drive power of the auxiliary light sources 135-1, 135-2 does not change.

The control section 121 judges whether or not the drive power of the auxiliary light sources 135-1, 135-2 is equal to or lower than a reference value (step S16). If the drive power of the auxiliary light sources 135-1, 135-2 is equal to or lower than the reference value, the control section 121 controls the auxiliary light source drive sections 133-1, 133-2 to stop driving the auxiliary light sources 135-1, 135-2 (step S17). On the other hand, if the drive power of the auxiliary light sources 135-1, 135-2 exceeds the reference value, the projector 100 executes the process of steps S13 through S16 repeatedly.

The control section 121 judges whether or not the power switch of the projector 100 is turned OFF (step S18). If the power switch has turned OFF, the control section 121 controls the principal light source drive section 132 to stop driving the principal light source 134 (step S19).

As described above, according to the present embodiment, the projector 100 can shorten the length of time before the image is actually displayed while suppressing the variation in light intensity by executing the control for making the combined light intensity a predetermined value or higher on the auxiliary light sources 135-1, 135-2 even in the case in which the principal light source 134 requiring time before providing the desired light intensity is used.

Third Embodiment

Figure 7:
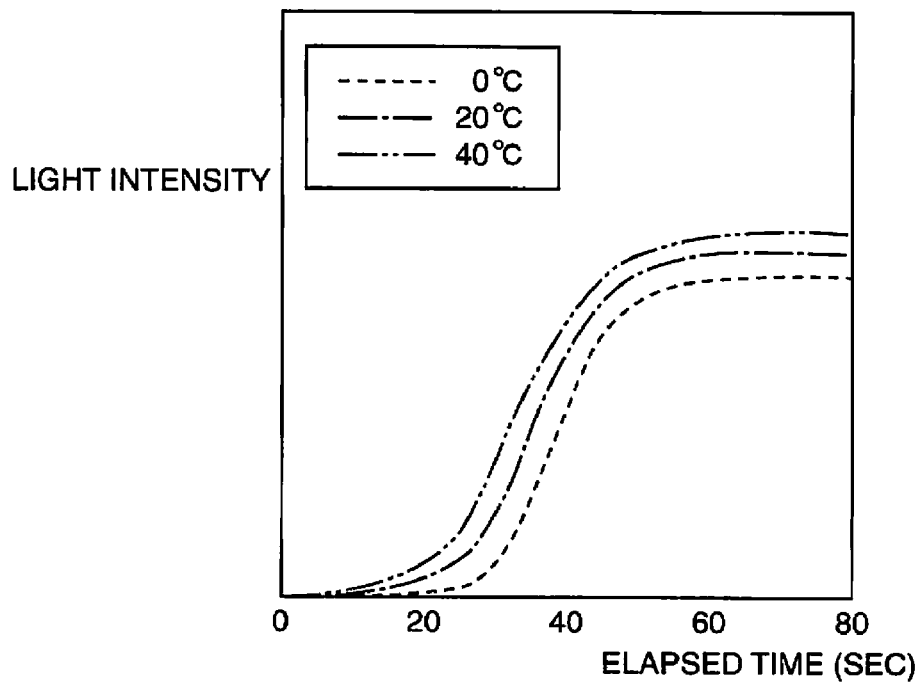
FIG. 7 is a diagram showing a difference in the light intensity of the principal light source according to the ambient temperature in a third embodiment of the invention.

Then, an embodiment in which the projector 100 adjusts the control of the auxiliary light source 135 based on the ambient temperature of the projector 100 will hereinafter be explained. FIG. 7 is a diagram showing a difference in the light intensity of the principal light source 134 according to the ambient temperature in the third embodiment of the invention. The light intensity of the principal light source 134 increases as the ambient temperature rises, for example, from 0° C. to 20° C., and further to 40° C. This is because, the lower the ambient temperature is, the lower the vaporization rate of the mercury of the principal light source becomes, and therefore, the lower the rate of increase of the light intensity becomes, thus the amount of vaporization of the mercury is reduced, thereby lowering the luminance of the emitted light.

Figure 8:
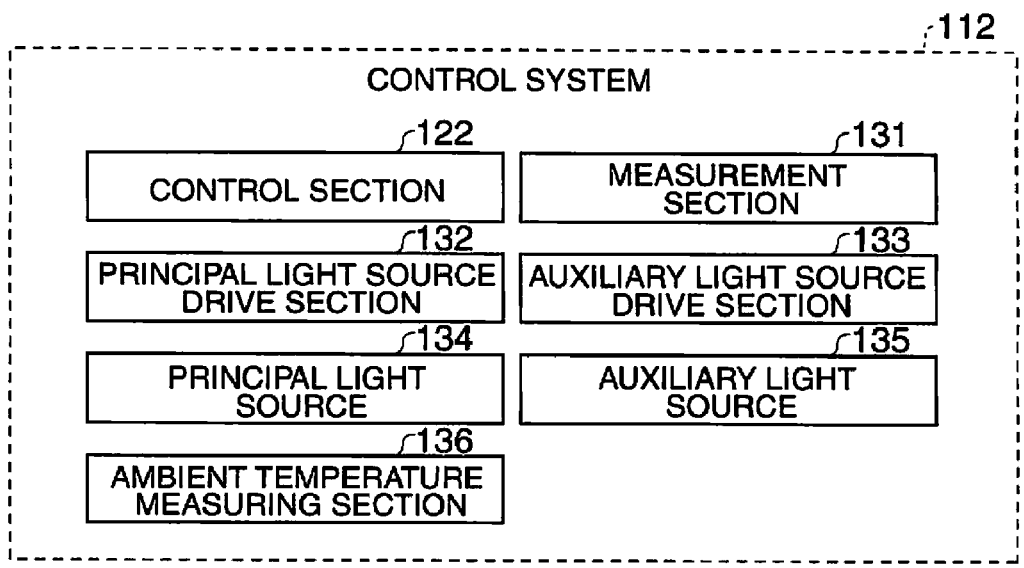
FIG. 8 is a functional block diagram of a control system according to the third embodiment of the invention.

FIG. 8 is a functional block diagram of a control system 112 according to the third embodiment of the invention. The control system 112 has an ambient temperature measuring section 136 (specifically, a thermometer or the like) in addition to the configuration described above. The control section 122 adjusts the control in accordance with the ambient temperature measured by the ambient temperature measuring section 136. Specifically, the control section 122 determines the necessary light intensity of the auxiliary light source 135 so that the higher the ambient temperature is, the lower the necessary light intensity becomes.

It should be noted that in reality, since a generally used projector is provided with a cooling fan, the light intensity of the principal light source 134 becomes to be hardly influenced by the ambient temperature when 20 minutes has elapsed. However, the generally used projector is problematically influenced by the ambient temperature right after it has been started up.

In contrast, according to the present embodiment, the projector 100 is capable of performing the appropriate control even right after it has been started up by adjusting the control in accordance with the ambient temperature, thus making it possible to project an image in a smaller amount of time.

Fourth Embodiment

Figure 9:
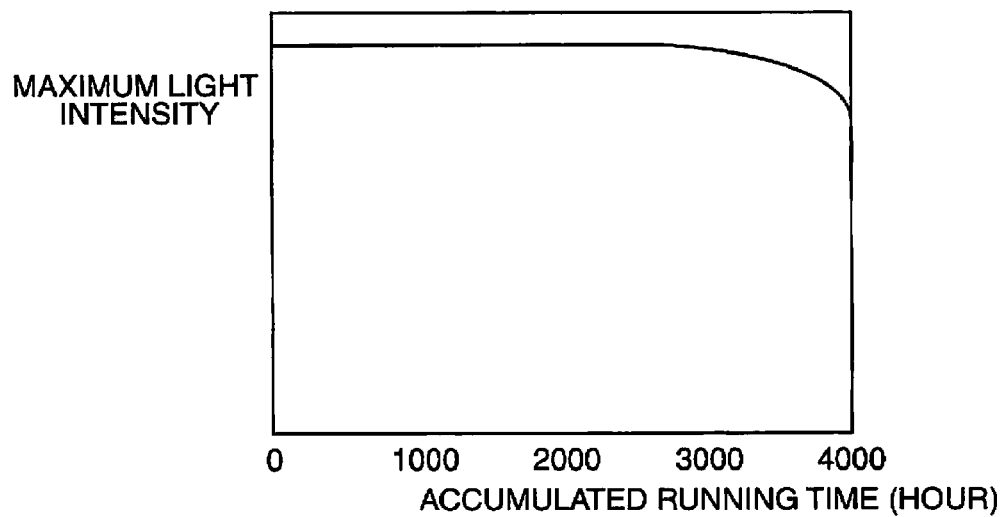
FIG. 9 is a diagram showing a difference in the maximum light intensity of the principal light source according to the accumulated running time in a fourth embodiment of the invention.

Then, an embodiment in which the projector 100 adjusts the control of the auxiliary light source 135 based on the accumulated running time of the projector 100 will hereinafter be explained. FIG. 9 is a diagram showing a difference in the maximum light intensity of the principal light source 134 according to the accumulated running time in the fourth embodiment of the invention. Although depending on the performance of the principal light source 134, when the accumulated running time of the projector 100 exceeds, for example, 2000 hours, the maximum light intensity of the principal light source 134 gradually decreases.

Figure 10:
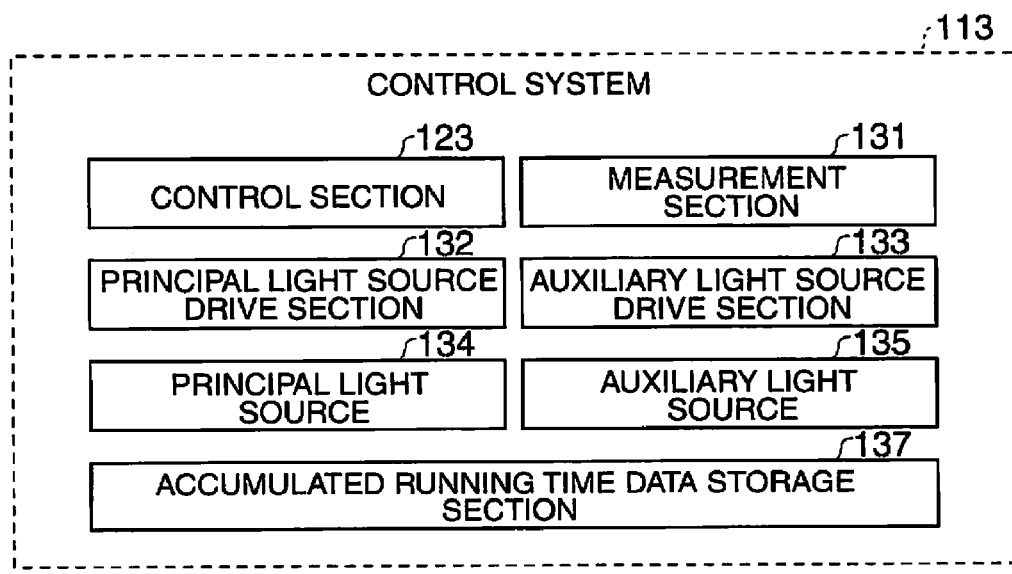
FIG. 10 is a functional block diagram of a control system according to the fourth embodiment of the invention.

FIG. 10 is a functional block diagram of a control system 113 according to the fourth embodiment of the invention. The control system 113 is further provided with an accumulated running timed at a storage section 137 for storing the accumulated running time data representing the accumulated running time in addition to the configuration explained in the first embodiment of the invention. The control section 123 adjusts the control in accordance with the accumulated running time. Specifically, the control section 123 determines the necessary light intensity of the auxiliary light source 135 so that the longer the accumulated running time is, the higher the necessary light intensity becomes in the case in which the accumulated running time has exceeded 3000 hours.

It should be noted that the accumulated running time data storage section 137 can be formed of, for example, a nonvolatile memory. Further, since the generally used projector has a configuration for measuring the accumulated running time, there is no need for newly adding the configuration for measuring the accumulated running time to the projector 100.

According to the present embodiment, the projector 100 is capable of performing the more appropriate control by adjusting the control in accordance with the accumulated running time, thus making it possible to project an image in a small amount of time.

Fifth Embodiment

Figure 11:
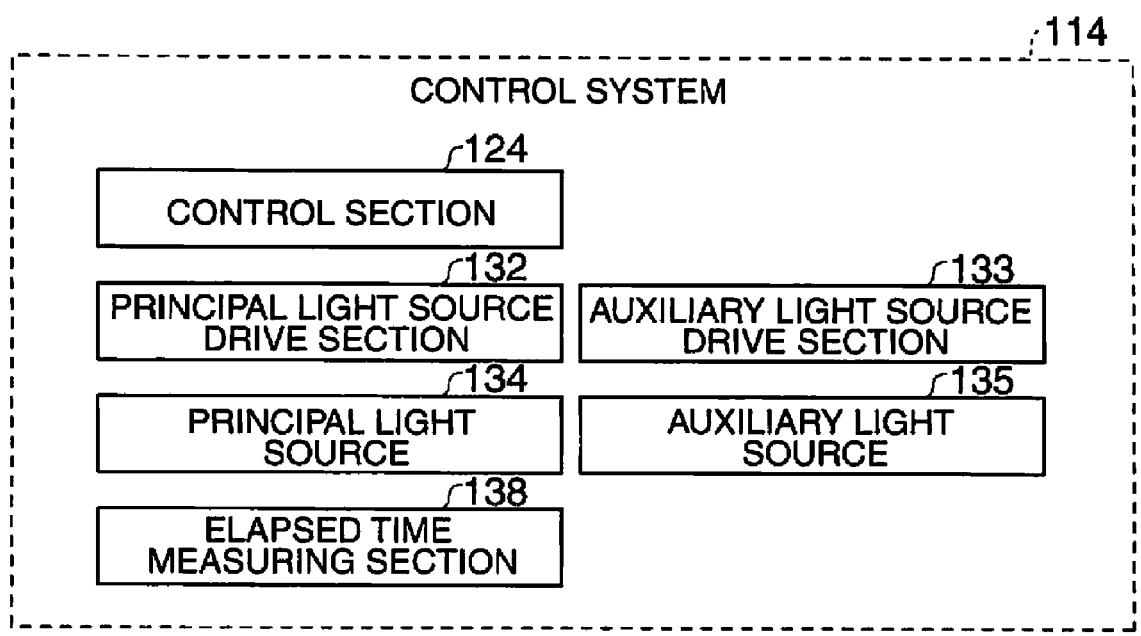
FIG. 11 is a functional block diagram of a control system according to a fifth embodiment of the invention.

Then, an embodiment in which the projector 100 adjusts the control of the auxiliary light source 135 based on the time elapsed after the start-up of the projector 100 will hereinafter be explained. FIG. 11 is a functional block diagram of a control system 114 according to the fifth embodiment of the invention. The control system 114 has an elapsed-time measuring section 138 (specifically a timer or the like) for measuring the time elapsed after the start-up of the projector 100 in addition to the configuration explained in the first embodiment. The control section 124 performs the control of the auxiliary light source 135 in accordance with the elapsed time.

It should be noted that in the case in which the control is performed in accordance with the elapsed time, the measurement section 131 is not necessarily required. As shown in FIG. 1, the light intensity of the principal light source 134 increases in accordance with the elapsed time in the typical circumstance. Therefore, the control section 124 can perform substantially the same control as in the embodiments described above using, for example, a table representing the relationship between the elapsed time and the light intensity of the principal light source 134.

Therefore, according to the present embodiment, the projector 100 is capable of projecting an image in a small amount of time by adjusting the control in accordance with the elapsed time without using the measurement section 131.

Other Embodiments

It should be noted that applications of the present invention is not limited to the embodiments described above, but various modifications thereof are possible. For example, it is possible to combine a part or all of the first through fifth embodiments. By combining, for example, the third embodiment and the fifth embodiment, it is possible that the control system stores the tables respectively representing the relationship between the elapsed time and the light intensity of the principal light source 134 for every range of the ambient temperature (e.g., every 10° C.), and the control section selects the table in accordance with the ambient temperature obtained from the ambient temperature measuring section 136 and uses the elapsed time obtained from the elapsed time measuring section 138 and the table, thereby appropriately determining the light intensity of the auxiliary light source 135 corresponding to the ambient temperature without using the measurement section 131.

Further, by combining, for example, the fourth embodiment and the fifth embodiment, it is possible that the control system stores the tables respectively representing the relationship between the elapsed time and the light intensity of the principal light source 134 for every range of the accumulated running time (e.g., every 500 hours), and the control section selects the table in accordance with the accumulated running time represented by the accumulated running time data stored in the accumulated running time data storage section 137 and uses the elapsed time obtained from the elapsed time measuring section 138 and the table, thereby appropriately determining the light intensity of the auxiliary light source 135 corresponding to the accumulated running time without using the measurement section 131.

Further, although in the first embodiment the control section 120 controls the auxiliary light source 135 so that the combined light intensity becomes a predetermined value, it is possible to performing the control with the predetermined value having a certain range. For example, the control sections 120 through 124 can control driving the auxiliary light source 135 so that the combined light intensity falls within the range from 10% higher to 10% lower than (a predetermined range around) the predetermined value. Specifically, it is possible that the control section 120 does not change the drive amount of the auxiliary light source 135 in the case in which the combined light intensity is within the predetermined range, increases the drive amount of the auxiliary light source 135 in the case in which the combined light intensity is lower than the lowest value of the predetermined range, or decreases the drive amount of the auxiliary light source 135 in the case in which the combined light intensity is higher than the highest value of the predetermined range.

According to this process, the projector 100 can set the combined light intensity to the desired condition by increasing the drive amount of the auxiliary light source 135 even in the case in which the light intensity of the principal light source 134 is lowered because of deterioration with age and so on. It should be noted that in such a case, it is possible to continue driving the auxiliary light source 135 until the power switch is turned OFF, and stop driving the auxiliary light source 135 when the power switch is turned OFF.

Further, according to the above process, the projector 100 can project an image with normal brightness in a small amount of time, and further, suppress the power consumption also after the brightness is stabled since the light intensity of the auxiliary light source 135 is controlled so that the combined light intensity is kept within a certain range.

Further, although in the third embodiment of the invention the control section 122 performs the control based on the ambient temperature, it is possible to perform the control based on, for example, the internal temperature measured by an internal temperature measuring section for measuring the internal temperature of the projector 100.

Further, the number of the light sources included in the auxiliary light source 135 is not limited to one or two, but can be three or more. Further, the control sections 120 through 124 can control the light intensity of the auxiliary light source 135 by performing control (e.g., lighting control of the light source, and drive control of the light source) of the lighting states of the light sources included in the auxiliary light source 135. For example, in the case in which the number of the light sources included in the auxiliary light source 135 is five, the control sections 120 through 124 can gradually decrease the light intensity of the auxiliary light source 135 by reducing the number of light sources to be lit from five to four, three, two, and then one.

Further, the position of the measurement section 131 is not limited to the embodiments described above. Further, the projector 100 can use the measurement section for measuring the light intensity of the principal light source and the measurement section for measuring the light intensity of the auxiliary light source, and further the measurement section for measuring the combined light intensity in addition to these measurement sections. For example, although in the embodiments described above, the control sections 120 through 124 perform the judgment using the drive power of the auxiliary light source 135, it is possible to perform the judgment using the light intensity of the auxiliary light source 135 instead of such a judgment.

Further, the principal light source 134 is not limited to the super-high pressure mercury lamp, but can be, for example, a metal halide lamp. Still further, the auxiliary light source 135 is not limited to the cold-cathode tube, but can be, for example, a light emitting diode (LED), a xenon lamp, a halogen lamp, or a fluorescent lamp.

Further, the projector 100 is not limited to the liquid crystal projector, but can be, for example, a projector using a digital micromirror device™ (DMD™). It should be noted that DMD™ is a trademark owned by the Texas Instruments (United States). Further, the liquid crystal panel of the liquid crystal projector is not limited to a three-panel type, but can be a single-panel type. Further, the liquid crystal panel can be either of the transmissive type and the reflective type. Further, the functions of the projector 100 and the control system 110 can be implemented in a plurality of devices (e.g., a PC and a projector) in a distributed manner.

The entire disclosure of Japanese Patent Application Nos: 2007-205236, filed Aug. 7, 2007 is expressly incorporated by reference herein.

What is claimed is:

1. A projector comprising:
a control system comprising:
a principal light source for outputting light to a light path used for image projection,
an auxiliary light source for outputting light to the light path so that the light output by the principal light source and the light output by the auxiliary light source are combined in the light path, and
a control section for controlling light intensity of the auxiliary light source; and
a projection section for projecting an image using the light from the light path, the projection section comprising:
a color separation optical system for separating the light from the light path into separate colored light beams, and
a color combining optical system for combining the separate colored light beams into one light beam,
wherein the control section performs one of control of setting combined light intensity obtained by combining light intensity of the principal light source and the light intensity of the auxiliary light source with each other in a certain range and control of setting the combined light intensity to be equal to or higher than a predetermined value.

2. The projector according to claim 1, further comprising a measurement section for measuring the combined light intensity,
wherein the control section performs the control of the auxiliary light source based on the combined light intensity measured by the measurement section.

3. The projector according to claim 1, further comprising a measurement section for measuring the light intensity of the principal light source,
wherein the control section performs the control of the auxiliary light source based on the light intensity of the principal light source measured by the measurement section.

4. The projector according to claim 1,
wherein the auxiliary light source is a light source requiring a smaller amount of time before providing desired light intensity compared to the principal light source.

5. The projector according to claim 1,
wherein the auxiliary light source is composed of a plurality of light sources, and
the control section controls the light intensity of the auxiliary light source by controlling lighting states of the plurality of light sources.

6. The projector according to claim 1,
wherein the auxiliary light source is formed of at least one light source, and
the control section controls the light intensity of the auxiliary light source by controlling lighting state of the at least one light source.

7. The projector according to claim 1,
wherein the control section adjusts the control of the auxiliary light source based on at least one of time elapsed after start-up of the projector, accumulated running time of the projector, ambient temperature of the projector, and internal temperature of the projector.

8. A program stored on a non-transitory computer readable information storage medium and executable by a computer included in a projector, the projector having a principal light source for outputting light to a light path used for image projection, an auxiliary light source for outputting light to the light path so that the light output by the principal light source and the light output by the auxiliary light source are combined in the light path, and a projection section for projecting an image using the light from the light path, the projection section comprising a color separation optical system for separating the light from the light path into separate colored light beams, and a color combining optical system for combining the separate colored light beams into one light beam, the program allowing the computer to function as a control section executing a process comprising:
performing one of control of setting combined light intensity obtained by combining light intensity of a principal light source and light intensity of an auxiliary light source with each other in a certain range and control of setting the combined light intensity to be equal to or higher than a predetermined value.

9. A non-transitory computer readable information storage medium storing a program executable by a computer included in a projector, the projector having a principal light source for outputting light to a light path used for image projection, an auxiliary light source for outputting light to the light path so that the light output by the principal light source and the light output by the auxiliary light source are combined in the light path, and a projection section for projecting an image using the light from the light path, the projection section comprising a color separation optical system for separating the light from the light path into separate colored light beams, and a color combining optical system for combining the separate colored light beams into one light beam, the program allowing the computer to function as a control section executing a process comprising:

performing one of control of setting combined light intensity obtained by combining light intensity of a principal light source and light intensity of an auxiliary light source with each other in a certain range and control of setting the combined light intensity to be equal to or higher than a predetermined value.

* * * * *